US008412545B2

(12) United States Patent
Stiff et al.

(10) Patent No.: US 8,412,545 B2
(45) Date of Patent: Apr. 2, 2013

(54) SYSTEM AND PROCESS FOR PROVIDING MULTIPLE INCOME START DATES FOR ANNUITIES

(75) Inventors: Geoffrey S. Stiff, Richmond, VA (US); Holly R. Snyder, Westerville, OH (US); Joel A. Prough, Harvard, MA (US); Brian E. Springer, Zionsville, IN (US)

(73) Assignee: Genworth Financial, Inc., Richmond, VA (US)

( * ) Notice: Subject to any disclaimer, the term of this patent is extended or adjusted under 35 U.S.C. 154(b) by 490 days.

(21) Appl. No.: 10/940,995

(22) Filed: Sep. 15, 2004

(65) Prior Publication Data
US 2005/0187840 A1 Aug. 25, 2005

Related U.S. Application Data

(60) Provisional application No. 60/502,659, filed on Sep. 15, 2003.

(51) Int. Cl.
*G06Q 40/00* (2006.01)
*G06Q 10/00* (2006.01)

(52) U.S. Cl. .................... 705/4; 705/1; 705/35; 705/36; 705/37

(58) Field of Classification Search .................. 705/1, 4, 705/35–37
See application file for complete search history.

(56) References Cited

U.S. PATENT DOCUMENTS

| | | | |
|---|---|---|---|
| 4,055,757 A | 10/1977 | Tillman et al. |
| 4,742,457 A | 5/1988 | Leon et al. |
| 4,750,121 A | 6/1988 | Halley |
| 4,876,648 A | 10/1989 | Lloyd |
| 4,969,094 A | 11/1990 | Halley et al. |
| 4,975,840 A | 12/1990 | DeTore et al. |
| 5,291,398 A | 3/1994 | Hagan |
| 5,523,942 A | 6/1996 | Tyler et al. |
| 5,631,828 A | 5/1997 | Hagan |
| 5,655,085 A | 8/1997 | Ryan et al. |
| 5,673,402 A | 9/1997 | Ryan et al. |
| 5,689,649 A | 11/1997 | Altman |
| 5,689,650 A | 11/1997 | McClelland et al. |
| 5,696,907 A | 12/1997 | Tom |
| 5,732,397 A | 3/1998 | DeTore et al. |
| 5,745,706 A | 4/1998 | Wolfberg et al. |
| 5,752,236 A | 5/1998 | Sexton |

(Continued)

FOREIGN PATENT DOCUMENTS
EP 0621556 10/1994
WO 98/22936 5/1998

(Continued)

OTHER PUBLICATIONS

Jon Tregarthen, "Double the Benefit with a Split Annuity," Life Association News; Sep. 1997; 92, 9 ABI/INFORM Global p. 124.*

(Continued)

*Primary Examiner* — William Rankins
(74) *Attorney, Agent, or Firm* — Hunton & Williams, LLP

(57) ABSTRACT

The present invention provides a method for providing an annuity structure and a system for processing an annuity structure. The annuity structure may include a base portion segment, where the base portion segment is a functional annuity having a first annuity schedule; and a secondary portion segment, where the secondary portion segment is a functional annuity having a second annuity schedule. In the invention, the base portion segment and the secondary portion segment each operate as its own annuity. Also, the base portion segment and the secondary portion segment are each included in a single contract, i.e., under the umbrella of one contract.

20 Claims, 6 Drawing Sheets

U.S. PATENT DOCUMENTS

| | | |
|---|---|---|
| 5,754,980 A | 5/1998 | Anderson et al. |
| 5,806,047 A | 9/1998 | Hackel et al. |
| 5,819,230 A | 10/1998 | Christie et al. |
| 5,864,685 A | 1/1999 | Hagan |
| 5,878,405 A | 3/1999 | Grant et al. |
| 5,893,071 A | 4/1999 | Cooperstein |
| 5,907,828 A | 5/1999 | Meyer et al. |
| 5,911,135 A | 6/1999 | Atkins |
| 5,913,198 A | 6/1999 | Banks |
| 5,926,792 A | 7/1999 | Koppes et al. |
| 5,930,760 A | 7/1999 | Anderton et al. |
| 5,933,815 A | 8/1999 | Golden |
| 5,946,668 A | 8/1999 | George |
| 5,966,700 A | 10/1999 | Gould et al. |
| 5,987,434 A | 11/1999 | Libman |
| 5,995,947 A | 11/1999 | Fraser et al. |
| 5,999,917 A | 12/1999 | Facciani et al. |
| 6,012,043 A | 1/2000 | Albright et al. |
| 6,014,632 A | 1/2000 | Gamble et al. |
| 6,021,397 A | 2/2000 | Jones et al. |
| 6,049,772 A | 4/2000 | Payne et al. |
| 6,052,673 A | 4/2000 | Leon et al. |
| 6,058,376 A | 5/2000 | Crockett |
| 6,064,969 A | 5/2000 | Haskins |
| 6,064,983 A | 5/2000 | Koehler |
| 6,064,986 A | 5/2000 | Edelman |
| 6,071,672 A | 6/2000 | Namba et al. |
| 6,071,673 A | 6/2000 | Iguchi et al. |
| 6,085,174 A | 7/2000 | Edelman |
| 6,235,176 B1 | 5/2001 | Schoen et al. |
| 6,275,807 B1 * | 8/2001 | Schirripa ............... 705/36 R |
| 6,282,520 B1 | 8/2001 | Schirripa |
| 6,304,859 B1 | 10/2001 | Ryan et al. |
| 6,343,272 B1 | 1/2002 | Payne et al. |
| 6,473,737 B2 | 10/2002 | Burke |
| 6,584,446 B1 | 6/2003 | Buchanan et al. |
| 6,592,030 B1 | 7/2003 | Hardesty |
| 6,609,111 B1 | 8/2003 | Bell |
| 6,611,807 B1 | 8/2003 | Bernheim et al. |
| 6,611,808 B1 | 8/2003 | Preti et al. |
| 6,611,815 B1 | 8/2003 | Lewis et al. |
| 6,615,180 B1 | 9/2003 | Anderton et al. |
| 6,625,582 B2 | 9/2003 | Richman et al. |
| 6,636,834 B1 * | 10/2003 | Schirripa ............... 705/36 R |
| 6,666,768 B1 | 12/2003 | Akers |
| 6,671,677 B2 | 12/2003 | May |
| 6,684,190 B1 | 1/2004 | Powers et al. |
| 6,947,904 B1 | 9/2005 | Macey |
| 6,950,805 B2 | 9/2005 | Kavanaugh |
| 6,963,852 B2 | 11/2005 | Koresko |
| 6,999,935 B2 | 2/2006 | Parankirinathan |
| 7,016,871 B1 | 3/2006 | Fisher et al. |
| 7,039,593 B2 | 5/2006 | Sager |
| 7,080,032 B2 | 7/2006 | Abbs et al. |
| 7,089,201 B1 | 8/2006 | Dellinger et al. |
| 7,113,913 B1 | 9/2006 | Davis et al. |
| 7,120,601 B2 | 10/2006 | Chen et al. |
| 7,143,051 B1 | 11/2006 | Hanby et al. |
| 7,149,712 B1 | 12/2006 | Lang |
| 7,249,030 B2 | 7/2007 | Sopko, III et al. |
| 7,249,037 B2 | 7/2007 | Koppes et al. |
| 7,249,077 B2 | 7/2007 | Williams et al. |
| 7,251,623 B1 | 7/2007 | Ryan et al. |
| 7,328,183 B1 | 2/2008 | Leisle |
| 7,376,608 B1 | 5/2008 | Dellinger |
| 7,392,202 B1 | 6/2008 | O'Brien |
| 7,398,241 B2 | 7/2008 | Fay et al. |
| 7,454,379 B1 | 11/2008 | Wolzenski et al. |
| 7,590,583 B1 | 9/2009 | Ferguson et al. |
| 7,613,644 B1 | 11/2009 | Abbs et al. |
| 7,640,202 B2 | 12/2009 | Foti et al. |
| 7,653,560 B2 | 1/2010 | Hueler |
| 7,676,414 B1 | 3/2010 | Abbs et al. |
| 7,685,007 B1 | 3/2010 | Jacobson |
| 7,685,056 B2 | 3/2010 | Menon |
| 7,685,065 B2 | 3/2010 | Weiss et al. |
| 7,698,158 B1 | 4/2010 | Flagg |
| 7,716,075 B1 | 5/2010 | Payne |
| 7,769,664 B2 | 8/2010 | Egan |
| 7,778,907 B1 | 8/2010 | Haskins et al. |
| 7,778,908 B1 | 8/2010 | Grumet |
| 7,797,174 B2 | 9/2010 | Samuels |
| 7,801,792 B2 | 9/2010 | Tatro et al. |
| 7,813,985 B2 | 10/2010 | O'Flinn et al. |
| 7,840,470 B2 | 11/2010 | Robinson |
| 7,840,471 B2 | 11/2010 | Foti et al. |
| 7,853,460 B2 | 12/2010 | Ruark |
| 7,877,306 B2 | 1/2011 | Michalowski et al. |
| 7,877,307 B2 | 1/2011 | Tatro et al. |
| 7,885,832 B2 | 2/2011 | Collins et al. |
| 7,885,834 B2 | 2/2011 | Weiss |
| 7,885,837 B1 | 2/2011 | Martin |
| 7,890,402 B2 | 2/2011 | Golembiewski |
| 8,060,384 B2 | 11/2011 | Landry |
| 8,060,387 B2 | 11/2011 | Landry |
| 8,065,170 B2 | 11/2011 | Weiss |
| 8,095,397 B2 | 1/2012 | Gray et al. |
| 8,095,398 B2 | 1/2012 | Dellinger et al. |
| 8,103,529 B1 | 1/2012 | Liebmann et al. |
| 8,108,298 B2 | 1/2012 | Tatro et al. |
| 8,108,308 B2 | 1/2012 | Buerger |
| 8,112,345 B2 | 2/2012 | Mercier et al. |
| 8,126,746 B2 | 2/2012 | Harris et al. |
| 8,135,598 B2 | 3/2012 | Brown et al. |
| 8,145,509 B2 | 3/2012 | Lange et al. |
| 8,150,715 B1 | 4/2012 | Yee et al. |
| 8,160,902 B2 | 4/2012 | Spalding, Jr. |
| 8,160,946 B2 | 4/2012 | Roche et al. |
| 8,165,902 B2 | 4/2012 | Chien et al. |
| 8,175,900 B2 | 5/2012 | Danielsen |
| 8,175,947 B2 | 5/2012 | Michalowski et al. |
| 8,175,952 B2 | 5/2012 | Brooker et al. |
| 8,175,971 B1 | 5/2012 | Landry |
| 8,180,656 B2 | 5/2012 | Barron, Jr. et al. |
| 8,185,417 B1 | 5/2012 | Brown et al. |
| 8,204,767 B2 | 6/2012 | Dellinger et al. |
| 8,204,816 B2 | 6/2012 | Brodsky et al. |
| 8,209,197 B2 | 6/2012 | Tatro et al. |
| 8,209,199 B1 | 6/2012 | Abbs et al. |
| 8,224,673 B2 | 7/2012 | Michalowski et al. |
| 8,266,055 B2 | 9/2012 | Weiss et al. |
| 2001/0014873 A1 | 8/2001 | Henderson et al. |
| 2001/0034619 A1 | 10/2001 | Sherman |
| 2001/0037276 A1 | 11/2001 | Kelly et al. |
| 2001/0049612 A1 | 12/2001 | Davis |
| 2002/0029158 A1 | 3/2002 | Wolff et al. |
| 2002/0035527 A1 | 3/2002 | Corrin |
| 2002/0052764 A1 | 5/2002 | Banks |
| 2002/0052784 A1 | 5/2002 | Sherwin |
| 2002/0052818 A1 | 5/2002 | Loveland |
| 2002/0059141 A1 * | 5/2002 | Davies et al. ............... 705/42 |
| 2002/0069090 A1 | 6/2002 | De Grosz et al. |
| 2002/0077866 A1 | 6/2002 | Javerlhac |
| 2002/0077868 A1 | 6/2002 | Javerlhac |
| 2002/0087365 A1 | 7/2002 | Kavanaugh |
| 2002/0091539 A1 | 7/2002 | Yin et al. |
| 2002/0103678 A1 | 8/2002 | Burkhalter et al. |
| 2002/0103679 A1 | 8/2002 | Burkhalter et al. |
| 2002/0103733 A1 | 8/2002 | Barrington et al. |
| 2002/0116311 A1 * | 8/2002 | Chalke et al. ............... 705/36 |
| 2002/0138386 A1 | 9/2002 | Maggioncalda et al. |
| 2002/0169715 A1 | 11/2002 | Ruth et al. |
| 2002/0184129 A1 | 12/2002 | Arena et al. |
| 2002/0188540 A1 | 12/2002 | Fay et al. |
| 2002/0194098 A1 | 12/2002 | Stiff et al. |
| 2002/0198802 A1 | 12/2002 | Koresko |
| 2002/0198827 A1 | 12/2002 | van Leeuwen |
| 2003/0004844 A1 * | 1/2003 | Hueler ............... 705/35 |
| 2003/0014285 A1 | 1/2003 | Richard |
| 2003/0014345 A1 * | 1/2003 | Lim ............... 705/36 |
| 2003/0018498 A1 | 1/2003 | Banks |
| 2003/0033172 A1 | 2/2003 | Menke |
| 2003/0055763 A1 * | 3/2003 | Linnenbringer et al. ....... 705/36 |
| 2003/0065539 A1 | 4/2003 | Kay |
| 2003/0088430 A1 | 5/2003 | Ruark |
| 2003/0088512 A1 | 5/2003 | Hoter-Ishay |
| 2003/0093303 A1 | 5/2003 | Pooler |

| | | |
|---|---|---|
| 2003/0125982 A1 | 7/2003 | Ginsberg |
| 2003/0135396 A1 | 7/2003 | Javerlhac |
| 2003/0167220 A1 | 9/2003 | Schoen et al. |
| 2003/0172018 A1 | 9/2003 | Chen et al. |
| 2003/0187764 A1 | 10/2003 | Abbs et al. |
| 2003/0191672 A1 | 10/2003 | Kendall et al. |
| 2003/0195827 A1 | 10/2003 | Lichtig |
| 2003/0233301 A1 | 12/2003 | Chen et al. |
| 2004/0078244 A1 | 4/2004 | Katcher |
| 2004/0088201 A1 | 5/2004 | Lang |
| 2004/0088236 A1 | 5/2004 | Manning |
| 2004/0093242 A1 | 5/2004 | Cadigan et al. |
| 2004/0107134 A1 | 6/2004 | Nelson |
| 2004/0111045 A1 | 6/2004 | Sullivan et al. |
| 2004/0117286 A1 | 6/2004 | Charnley, Jr. |
| 2004/0158517 A1 | 8/2004 | Mahaney et al. |
| 2004/0172350 A1* | 9/2004 | Atkinson et al. ............... 705/35 |
| 2004/0177022 A1 | 9/2004 | Williams et al. |
| 2004/0181436 A1 | 9/2004 | Lange |
| 2004/0199446 A1 | 10/2004 | Lange |
| 2004/0225536 A1 | 11/2004 | Schoen et al. |
| 2004/0249660 A1 | 12/2004 | Williams et al. |
| 2004/0267647 A1 | 12/2004 | Brisbois |
| 2005/0010453 A1 | 1/2005 | Terlizzi et al. |
| 2005/0015282 A1 | 1/2005 | Gutman et al. |
| 2005/0033611 A1 | 2/2005 | Phelps |
| 2005/0033612 A1 | 2/2005 | Donovan et al. |
| 2005/0038681 A1 | 2/2005 | Covert |
| 2005/0038682 A1 | 2/2005 | Gandee et al. |
| 2005/0060251 A1* | 3/2005 | Schwartz et al. ............... 705/35 |
| 2005/0071205 A1 | 3/2005 | Terlizzi et al. |
| 2005/0080739 A1 | 4/2005 | Sherzan et al. |
| 2005/0080741 A1 | 4/2005 | Sherzan |
| 2005/0144124 A1 | 6/2005 | Stiff et al. |
| 2005/0149425 A1 | 7/2005 | Hagan |
| 2005/0154658 A1 | 7/2005 | Bove et al. |
| 2005/0177509 A1 | 8/2005 | Mahaney et al. |
| 2005/0187869 A1 | 8/2005 | Buerger |
| 2005/0216316 A1 | 9/2005 | Brisbois et al. |
| 2005/0234747 A1 | 10/2005 | Kavanaugh |
| 2005/0234821 A1 | 10/2005 | Benham et al. |
| 2006/0026036 A1 | 2/2006 | Mahmood |
| 2006/0041453 A1 | 2/2006 | Clark et al. |
| 2006/0041455 A1 | 2/2006 | Dehais |
| 2006/0059020 A1 | 3/2006 | Davidson |
| 2006/0080191 A1 | 4/2006 | Hinson |
| 2006/0085313 A1 | 4/2006 | Selby |
| 2006/0085338 A1 | 4/2006 | Stiff et al. |
| 2006/0143055 A1 | 6/2006 | Loy et al. |
| 2006/0146951 A1 | 7/2006 | Chiu |
| 2006/0149651 A1 | 7/2006 | Robinson |
| 2006/0155631 A1 | 7/2006 | Kondaks |
| 2006/0161461 A1 | 7/2006 | Trani et al. |
| 2006/0206417 A1 | 9/2006 | Selby |
| 2006/0212380 A1 | 9/2006 | Williams et al. |
| 2006/0242052 A1 | 10/2006 | Long et al. |
| 2006/0271411 A1 | 11/2006 | Gregg et al. |
| 2007/0011089 A1 | 1/2007 | DeSchryver |
| 2007/0021986 A1 | 1/2007 | Cheung et al. |
| 2007/0033124 A1 | 2/2007 | Herr et al. |
| 2007/0038481 A1 | 2/2007 | Darr |
| 2007/0038487 A1 | 2/2007 | McCarthy |
| 2007/0050217 A1 | 3/2007 | Holden, Jr. |
| 2007/0061238 A1 | 3/2007 | Merton et al. |
| 2007/0078690 A1 | 4/2007 | Kohl |
| 2007/0094053 A1 | 4/2007 | Samuels |
| 2007/0094054 A1 | 4/2007 | Crabb |
| 2007/0094125 A1 | 4/2007 | Izyayev |
| 2007/0094127 A1 | 4/2007 | Izyayev |
| 2007/0100720 A1 | 5/2007 | Bonvouloir |
| 2007/0100726 A1 | 5/2007 | O'Flinn et al. |
| 2007/0136164 A1 | 6/2007 | Roti et al. |
| 2007/0143199 A1 | 6/2007 | Stiff et al. |
| 2007/0162365 A1 | 7/2007 | Weinreb |
| 2007/0168235 A1 | 7/2007 | Livingston et al. |
| 2007/0185741 A1 | 8/2007 | Hebron et al. |
| 2007/0214022 A1 | 9/2007 | Hagelman, Jr. et al. |
| 2007/0214071 A1 | 9/2007 | Stone |
| 2007/0250427 A1 | 10/2007 | Robinson |
| 2008/0010095 A1 | 1/2008 | Joyce |
| 2008/0021744 A1 | 1/2008 | Walker et al. |
| 2008/0027762 A1 | 1/2008 | Herzfeld et al. |
| 2008/0071661 A1 | 3/2008 | Jeudy et al. |
| 2008/0077450 A1 | 3/2008 | Klippel |
| 2008/0082371 A1 | 4/2008 | Phillips |
| 2008/0103839 A1 | 5/2008 | O'Brien |
| 2008/0109263 A1 | 5/2008 | Clark et al. |
| 2008/0109341 A1 | 5/2008 | Stiff |
| 2008/0133280 A1 | 6/2008 | Ziegler |
| 2008/0154637 A1 | 6/2008 | Capelli et al. |
| 2008/0215376 A1 | 9/2008 | Engelman |
| 2008/0270194 A1 | 10/2008 | West et al. |
| 2008/0270195 A1 | 10/2008 | Gottlieb |
| 2008/0281761 A1 | 11/2008 | Egan |
| 2008/0288297 A1 | 11/2008 | Koo |
| 2009/0030735 A1 | 1/2009 | Tatro et al. |
| 2009/0030736 A1 | 1/2009 | Tatro et al. |
| 2009/0030737 A1 | 1/2009 | Weiss |
| 2009/0030738 A1 | 1/2009 | Golembiewski |
| 2009/0030739 A1 | 1/2009 | Tatro et al. |
| 2009/0030740 A1 | 1/2009 | Robinson |
| 2009/0037231 A1 | 2/2009 | Menke |
| 2009/0063203 A1 | 3/2009 | Baiye |
| 2009/0089104 A1 | 4/2009 | Kondaks |
| 2009/0094069 A1 | 4/2009 | Castille et al. |
| 2009/0094070 A1 | 4/2009 | Harris et al. |
| 2009/0099979 A1 | 4/2009 | Raghavan et al. |
| 2009/0132300 A1 | 5/2009 | Weiss et al. |
| 2009/0132430 A1 | 5/2009 | Weiss |
| 2009/0171831 A1 | 7/2009 | Johnson et al. |
| 2009/0192829 A1 | 7/2009 | Long et al. |
| 2009/0192830 A1 | 7/2009 | Shemtob |
| 2009/0271222 A1 | 10/2009 | Marks et al. |
| 2009/0307016 A1 | 12/2009 | Gray et al. |
| 2009/0319303 A1 | 12/2009 | Harkensee et al. |
| 2010/0030583 A1 | 2/2010 | Fievoli et al. |
| 2010/0030584 A1 | 2/2010 | Guilbert et al. |
| 2010/0070310 A1 | 3/2010 | Ferguson et al. |
| 2010/0076792 A1 | 3/2010 | Mule et al. |
| 2010/0088114 A1 | 4/2010 | Carstens |
| 2010/0106532 A1 | 4/2010 | Brown et al. |
| 2010/0121659 A1 | 5/2010 | Hueler |
| 2010/0125465 A1 | 5/2010 | Hueler |
| 2010/0131423 A1 | 5/2010 | Meyer et al. |
| 2010/0138245 A1 | 6/2010 | Baiye |
| 2010/0145735 A1 | 6/2010 | Kendall et al. |
| 2010/0169128 A1 | 7/2010 | Berlin et al. |
| 2010/0169129 A1 | 7/2010 | Kavanaugh |
| 2010/0174565 A1 | 7/2010 | Weiss et al. |
| 2010/0185468 A1 | 7/2010 | Methot |
| 2010/0256995 A1 | 10/2010 | Oliver |
| 2010/0299160 A1 | 11/2010 | Roscoe et al. |
| 2011/0035239 A1 | 2/2011 | Scheinerman et al. |
| 2011/0066453 A1 | 3/2011 | Tatro et al. |
| 2011/0231211 A1 | 9/2011 | Griffin |
| 2011/0238453 A1 | 9/2011 | Roche et al. |
| 2011/0246245 A1 | 10/2011 | Coleman |
| 2011/0251859 A1 | 10/2011 | McCullough et al. |
| 2011/0264473 A1 | 10/2011 | Abreu et al. |
| 2011/0270637 A1 | 11/2011 | Tatro et al. |
| 2011/0282696 A1 | 11/2011 | Weiss et al. |
| 2012/0022899 A1 | 1/2012 | Landry |
| 2012/0072245 A1 | 3/2012 | Schiminovich |
| 2012/0084104 A1 | 4/2012 | Harkensee et al. |
| 2012/0095785 A1 | 4/2012 | Gore et al. |
| 2012/0101857 A1 | 4/2012 | Harris et al. |
| 2012/0116822 A1 | 5/2012 | Vasavada et al. |
| 2012/0158435 A1 | 6/2012 | Sexauer et al. |
| 2012/0209629 A1 | 8/2012 | Gordon et al. |
| 2012/0209631 A1 | 8/2012 | Roscoe et al. |

FOREIGN PATENT DOCUMENTS

| | | |
|---|---|---|
| WO | WO 00/13118 | 3/2000 |
| WO | WO 00/14664 | 3/2000 |
| WO | 00/20512 | 3/2001 |
| WO | 00/88834 | 11/2001 |

| WO | WO 02/067096 | 8/2002 |
| WO | 2004/099943 | 11/2004 |
| WO | 2009/074878 | 6/2009 |

OTHER PUBLICATIONS

Double the benefit with a split annuity Jon E Tregarthen. Life Association News. Washington: Sep. 1997. vol. 92, Iss. 9.*
Listen carefully and sell more annuities, Bruce F Andrews. Life & Health Insurance Sales. Indianapolis: Nov./Dec. 1997. vol. 140, Iss. 6.*
Annuity Tax and Planning Considerations Smith, Dan W., Powell, Gary V., Tegeler, Jeffrey W.. Journal of the American Society of CLU & ChFC. Bryn Mawr: Jan. 1992. vol. 46, Iss. 1.*
Annuity Tax and Planning Considerations Smith, Dan W., Powell, Gary V., Tegeler, Jeffrey W.. Journal of the American Society of CLU & ChFC. Bryn Mawr: Jan. 1992. vol. 46, Iss. 1; p. 34, 10 pgs.*
Double the benefit with a split annuity Jon E Tregarthen. Life Association News. Washington: Sep. 1997. vol. 92, Iss. 9; p. 124, 2 pgs.*
Retirees Sue Metlife, Ex-Agent in Tulsa Dan Rutherford Tulsa World Jun. 11, 1996 03:10 E.T.*
Rep Spotlight: Buddy White NCB Central Carolina Bank, Greenville, SC ; Stepping in where half a dozen previous reps had failed, White says he does more teaching than selling across a vast territory, Anonymous, Bank Investment Marketing , p. 14 , Jan 1, 2002.*
The federal income taxation of annuities: A success story Griffin, Mark E. Journal of the American Society of CLU & ChFC. Bryn Mawr: May 1995.*
Area experts offer advice on making investments work Friedberg, Ruth Daily Breeze ( Cape Coral , FL , US ) s A p 5 Publication Date: Mar. 8, 1994.*
Compare split annuity's package deal to other investments Series: on Money; [South Pinellas Edition] Helen Huntley. St. Petersburg Times. St. Petersburg, Fla.: Dec. 29, 2002. p. 3.H.*
Fort Worth Star-Telegram, Texas, Todd Mason Column Todd Mason Fort Worth Star-Telegram, Texas Oct. 20, 1998.*
Prudential Introduces Income Bridge Approach to Retirement Planning, Business Wire, Mar. 15, 2004, 1 pg.
Prudential Retirement Expands Patent-Pending Income Bridge Approach(R) to Help Maximize Social Security Benefits to Retail Clients: New Report Unveiled on Helping to Maximize Social Security Benefits, Business Wire, 2006, 2 pgs.
Ibbotson Seeks Partnerships for Combined Fund, Annuity, Defined Contribution & Savings Plan Alert, Euromoney Institutional Investor PLC, Nov. 10, 2006, 1 pg.
Lincoln Financial Group Enhances Variable Annuity Option Lincoln SmartSecurity(SM) Advantage to Offers Guaranteed Lifetime Income for Both Investor and Spouse, PR Newswire Association LLC, Nov. 6, 2006, 3 pgs.
Lincoln Financial Group's i4LIFE® Advantage Reaches Milestone as Elections Cross $1.0 Billion in 2006 Sales; Straight Record-Breaking Quarter, PR Newswire Association LLC, Nov. 6, 2006, 3 pgs.
Prudential Responds to 'Retirement Revolution' with Innovative, Patent-Pending Guaranteed-Income Product, Business Wire, Dec. 13, 2006, 3 pgs.
Debaise, Insurers Add a Twist to Annuity Offerings, The Wall Street Journal. online (www.WSJ.com), Jan. 5, 2006, 4 pgs.
New York Life Brings Longevity Protection to Immediate Annuities: New Option Allows Clients to Customize retirement Payments According to Personal Needs and Life Events, Business Wire, Oct. 6, 2005, 2 pgs.
Lavine, New York Life Annuity Builds on Two Popular Features: Expects New Product to Attract $200 Million Within a Year, Annuity Market News, Thomson Media Inc. Feb. 1, 2005, 2 pgs.
American Express Financial Group Launches Annuities Feature Designed to Help Investors "Fight Off the Bears and Run With the Bulls", Business Wire, May 3, 2005, 2 pgs.
Golden Rule Insurance Company Receives Patent for Its Life/Long-Term Care Insurance Concept, PR Newswire, Jul. 15, 2003, 1 pg.
Hogan, 401(k) Provider Offers Guaranteed Income, www.ignites.com, Apr. 14, 2005, 2 pgs.
Tergesen, New Wrinkles for Annuities, BusinessWeek, Jul. 24, 2006, 4 pgs.
McEvoy, Replacing Insurance Policies Can Be Tricky, State Journal Register, Jan. 29, 1995, 2 pgs.
Fraser, Short Takes: Discover Brokerage Top 10 Stocks, American Broker, vol. 164 Issue 40 Mar. 1, 1999, 1 pg.
New Variables Annuity Features Provide Value, but at a Cost, http://www.insure.com/life/annuity/newfeatures.html, May 16, 2001, 4 pgs.
Getting out of your Annuity, http://www.insure.com/life/annuity/basics.html, Oct. 16, 2007, 2 pgs.
The Ups and Downs of Immediate Variable Annuities, http://www.insure.com/life/annuity/getout/html, Aug. 29, 2003, 3 pgs.
The Basics of Annuities, http://www.insure.com/annuity/immediate.html, Sep. 24, 2007, 6 pgs.
Brown, et al., Joint Life Annuities and Annuity Demand by Marries Couples, Journal of Risk and Insurance, 67, 4, 527, Dec. 2000, 21 pgs.
Planco Provides Marketing Services Include Colonial Penn's Popular Annuity, Financial Services Report, vol. 7 No. 10, May 9, 1990, 4 pgs.
New York Life Introduces LifeStages® Elite Variable Annuity, New York Life, Oct. 1, 2003, 2 pgs.
New York Life Unveils Lifetime Income Product Featuring Liquidity, Inflation Protection, and Legacy Options, New York Life, Aug. 20, 2003, 2 pgs.
International Search Report dated May 4, 2004 for Application No. PCT/US03/05696.
International Search Report dated Dec. 10, 2002 for Application No. PCT/US02/16471.
Smith et al., Annuity Tax and Planning Considerations, Journal of the American Society of CLU & ChFC, Bryn Mawr, vol. 46, lss. 1, Jan 1992.
Andrews, Listen Carefully and Sell More Annuities, Life & Health Insurance Sales, Indianapolis, vol. 140, Iss. 6, Nov./Dec. 1997.
Tregarthen, Double the Benefit with a Split Annuity, Life Association News, Washington, vol. 92, lss. 9, Sep. 1997.
Feldstein et al., Accumulated Pension Collars: A Market Approach to Reducing the Risk of Investment-Based Social Security Reform, National Bureau of Economic Research Working Paper 7861, Aug. 2000.
www.annuityadvisors.com/FAQ/EquityIndexed.asp.
Derivatives R US—Structured Notes, 1995.
U.S. Appl. No. 09/595,898, filed Jun. 20, 2000.
"TIAA-CREF Life Introduces Innovative Low-Cost Single Premium Immediate Annuity," Aug. 16, 2001.
Feldman, A. "Can This New 401(k) Save Retirement?," Business Week, Feb. 16, 2009.
"Which Types Of Insurance Do You Actually Need?" www.thirdage.com, 2006.
Griffin, Mark E "The federal income taxation of annuities: A success story" May 1995 Journal of the American Society of CLU & ChFC v49n3 pp. 44-56.
Anonymous "The White House: Remarks by the President in Social Security Forum Town Hall meeting—Part 1 of 3" Jul. 28, 1998M2 Presswire , p. N/A.
Customer Action. Understanding Credit Card Costs. Dec. 27, 1996. p. 1-8. As viewed on May 4, 2011 at http://www.consumer-action.org/english/articles/understanding_credit_card_costs_tips_on_reducing_finance.

* cited by examiner

SYSTEM AND PROCESS FOR PROVIDING MULTIPLE INCOME START DATES FOR ANNUITIES

This application claims priority to provisional application 60/502,659, filed Sep. 15, 2003, which is incorporated herein by reference in its entirety.

FIELD OF THE INVENTION

The present invention relates generally to annuities, and more specifically to annuities having multiple income start dates.

BACKGROUND OF THE INVENTION

An annuity or an "annuity structure" might be characterized as a contract in which an individual or other entity agrees to pay a premium, in the form of a lump sum, to an insurance company, or other issuing entity, and in exchange receives a regular stream of income from the insurance company over a period of time. The period of time might be a set number of years or for life, for example. In accordance with another aspect of an annuity, an annuity or an "annuity structure" might be characterized as a contract that is structured to accumulate premiums plus interest leading up to maturity of the annuity, and then distribute the proceeds of the annuity through a series of regular payments over the period of time. For example, annuities may be structured to protect against the risk of a person living longer than is expected and, as a result, outliving the person's accumulated savings, which may be a concern in other savings plan arrangements.

Known annuity structures simply do not provide a degree of flexibility that would be desirable by persons. For example, currently, deferred annuities are known to have to accommodate partial annnuitization, or have multiple start dates to the payout stream. However, in this type of a known transaction, the annuity is split into two contracts or a supplemental contract is created in order to have two or more annuity commencement dates (ACDs). Accordingly, even this type of annuity does not provide the degree of flexibility that is desired.

SUMMARY OF THE INVENTION

Accordingly, one aspect of the invention is to address one or more of the drawbacks set forth above.

The present invention provides a method for providing an annuity structure and a system for processing an annuity structure. The annuity structure may include a base portion segment, where the base portion segment is a functional annuity having a first annuity schedule; and a secondary portion segment, where the secondary portion segment is a functional annuity having a second annuity schedule. In the invention, the base portion segment and the secondary portion segment each operate as its own annuity. Also, the base portion segment and the secondary portion, segment are each included in a single contract, i.e., under the umbrella of one contract.

In the annuity structure as described herein, the base portion segment and the secondary portion segment may respectively be used to fund the other. That is, the base portion segment may be used to fund the secondary portion segment or visa-versa.

DETAILED DESCRIPTION OF THE INVENTION

A system and process for purchasing, creating, maintaining and using a portional annuity are described. The system and process make use of two or more functional annuities to enable manipulation of the annuity commencement date. One technical effect of the invention is to provide a system and process for purchasing, creating and using portional annuities to assist consumers in overall financial planning, including tax, retirement, and estate planning, as set forth in the Brief Description of the Invention, above and as more fully described here in the Detailed Description of the Invention. Various aspects and components of this system and process are described below.

According to an embodiment of the invention, a portional annuity is an annuity that is separated into two or more functional annuities. A portional annuity includes a base contract and one or more portional segments that act as independent annuities. Each portional segment can operate on its own annuitization schedule. According to an embodiment of the invention, the last functional annuity to annuitize, generally the Base Contract, controls the contract's transition from deferred status to immediate status. The point of transition may also be referred to as the contract's annuity commencement date ("ACD"). Each portional segment may transition from accumulation to payout on, before or after the ACD.

The point at which each of these earlier functional annuities transitions from accumulation to payout is known as that segment's portional income exercise date ("PIED"). Transfers of funds may be made between the base contract and the portional segments or between the portional segments. The owner/annuitant may have the right to transfer the payout after the PIED to other base contract investment, options (or other portional segment investment options) or withdraw the payout from the base contract. Payments received by the owner/annuitant may be distributed based on the contract status of the base contract. The multiple functional annuities can be purchased as a base contract feature, endorsement, rider, term and/or condition.

Figure 1:
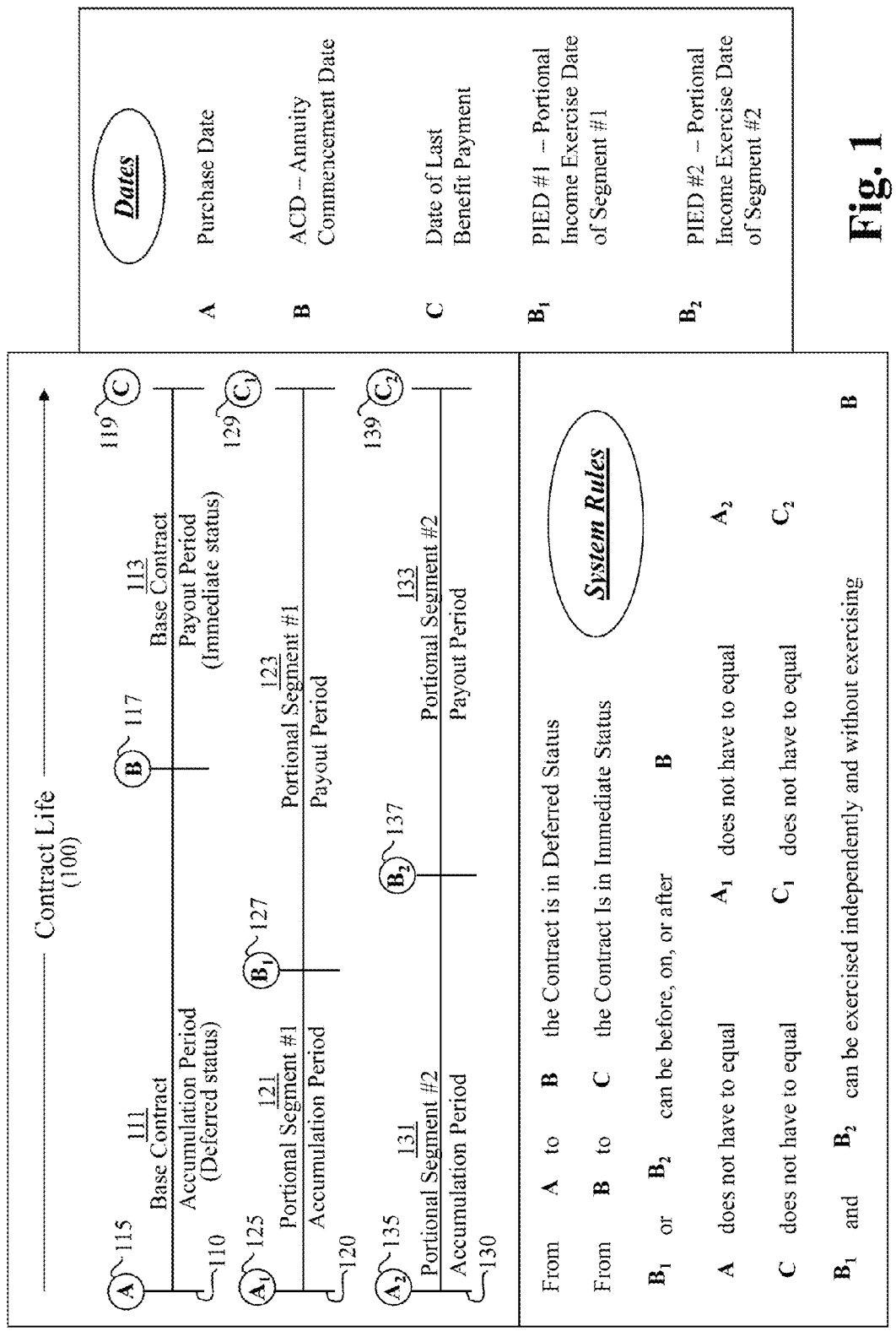
FIG. 1 is a diagram of a time line of a contract life for a portional annuity according to an embodiment of the invention.

FIG. 1 is a diagram illustrating a time line of a contract life for a portional annuity according to an embodiment of the invention. In the example illustrated in FIG. 1, the portional annuity 100 includes a base contract 110, a first portional segment 120 and a second portional segment 130. The base contract 110 has an accumulation period 111 and a payout period 113. The accumulation period 111 occurs between the purchase date 115 and the annuity commencement date 117. The payout period 113 occurs between the annuity commencement date 117 and the date of the last benefit payment 119. The first portional segment 120 also has an accumulation period 121 and a payout period 123. The accumulation period 121 occurs between the purchase date 125 and the annuity commencement date 127. The payout period 123 occurs between the annuity commencement date 127 and the date of the last benefit payment 129. The second portional segment 130 has an accumulation period 131 and a payout period 133. The accumulation period 131 occurs between the purchase date 135 and the annuity commencement date 137. The payout period 133 occurs between the annuity commencement date 137 and the date of the last benefit payment 139.

During the accumulation period 411 of the base contract 110, the contract is considered as being in deferred status. During the payout period 113 of the base contract 110, the contract is considered as being in immediate status. While the annuity commencement dates 127 and 137 are shown as being before the annuity commencement date 117 of the base contract 110, it is understood that annuity commencement dates 127 and/or 137 may be either before or after annuity commencement date 117. Further, the purchase date 115 does not have to equal either purchase date 125 or purchase date 135. Further, purchase date 125 does not have to equal purchase date 135. In addition, the date of last benefit payment 119 does not have to equal either the date of last benefit payment 129 or the date of last benefit payment 139. Further, the date of last benefit payment 129 does not have to equal the date of last benefit payment 139.

The annuity commencement date 127 is the portional income exercise date of the first portion 120. The annuity commencement date 137 is the portional income exercise date of the second portion 130. The portional income exercise date 127 of the first portion 120 may be exercised independent of the portional income exercise date 137 of the second portion 130, and both may be exercised independently and without exercising the annuity commencement date 117 of base contract 110.

Figure 2:
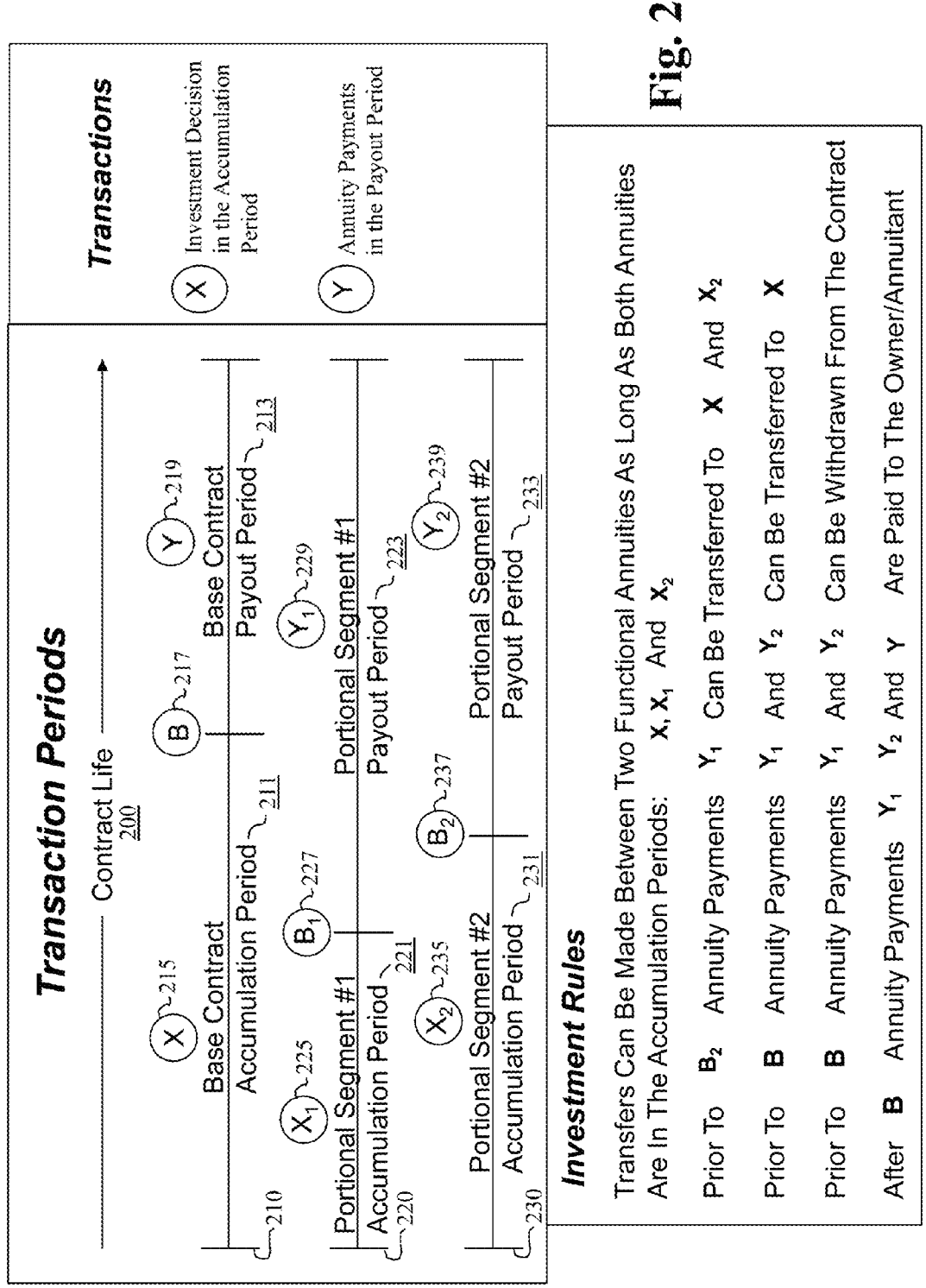
FIG. 2 is a further diagram of a time line of a contract life for a portional annuity according to an embodiment of the invention.

FIG. 2 is an illustration of a time line of a contract life for a portional annuity according to an embodiment of the invention. In the example illustrated in FIG. 2, the portional annuity 200 includes a base contract 210, a first portional segment 220 and a second portional segment 230. The base contract 210 has an accumulation period 211 and a payout period 213. Investment decisions 215 are made for the base contract 210 during the accumulation period 211. Annuity payments 219 are made for the base contract 210 during the payout period 213. The first portional segment 220 has an accumulation period 221 and a payout period 223. Investment decisions 225 are made for the first portional segment 220 during the accumulation period 221. Annuity payments 229 are made for the first portional segment 220 during the payout period 223. The second portional segment 230 has an accumulation period 231 and a payout period 233. Investment decisions 235 are made for the second portional segment 230 during the accumulation period 231. Annuity payments 239 are made for the second portional segment 230 during the payout period 233.

According to an embodiment of the invention, various investment rules may be associated with a portional annuity. Transfers of funds may be made between two functional annuities segments (e.g., any of base contract 210, first portional segment 220 and second portional segment 230) as long as both annuity segments are in the accumulation period. As illustrated in the example of FIG. 2, prior to annuity commencement date 237 of second portional segment 230, annuity payments during payout period 223 may be transferred to either base contract 210, during accumulation period 211, or to second portional segment 230, during accumulation period 231.

Further, as illustrated in the example of FIG. 2, prior to the annuity commencement date 217 of base contract 210, annuity payments during payout period 223 and payout period 233 may be transferred to base contract 210 during accumulation period 211. In addition, prior to the annuity commencement date 217 of base contract 210, annuity payments during payout period 223 and payout period 233 may be withdrawn from the portional annuity 200. Further, after the annuity commencement date 217 of base contract 210, annuity payments during payout period 213, payout period 223 and payout period 233 may be paid to the owner or annuitant.

According to an embodiment of the invention, during the contract deferred period of a portional annuity, the annuitant is given the option to reinvest a segment's annuitized payments into another investment account within the contract. Further, the contract provisions may vary between the portional segments, thereby allowing an annuitant to customize the portional annuity. A portional annuity may be designed to have guaranteed benefits, such as payment floors, and may be offered without the payments being distributed to the annuitant. In addition, insurance company risk mitigation features, such as retirement accounts, may be implemented without a payment to the policyholder.

Previously, when a policyholder/annuitant wants to buy two different annuities they would buy two different contracts. According to an embodiment of the invention, at or after policy issue, the owner/annuitant is able to buy two or more annuities under one contract if allowed by the contract provisions. These two or more annuities may act independently of each other. Buying one annuity contract rather than two or more annuity contracts changes the regulatory structure of the benefits. For purposes of various regulatory and government agencies (e.g. IRS, SEC, NAIC, etc.), with one contract there is one ACD rather than with multiple contracts where there are multiple ACDs. The customer now has the option to characterize payments as withdrawals, transfers, or annuity payments based on when the distribution is made in relation to the ACD. With a single contract reinvestment from one of the annuities to another, the fund movement is considered a transfer rather than a distribution from one and a purchase of another. Therefore, a portional annuity may avoid the regulation relating to severability of two contracts deemed to be one. Further, a portional annuity may allow a contract to require a predetermined portional income exercise date separate from a variable ACD. A portional annuity of the present invention may be combined with other financial products to provide other income savings product.

By way of an example, a portional annuity rider ("PAR") may be used as a rider on other variable annuities. The rider may have different features from the base contract and may be annuitized (e.g., partial annuitization) separately from the base contract. A PAR may act like a separate variable annuity inside another variable annuity. The base contract status may control the tax status of the distributions to the owner/annuitant. Annuitized income from the PAR can be withdrawn from contract in deferred status (e.g., taxed gain first), can be transferred to base contract in deferred status (e.g., tax free transfer), and/or can be paid-out from the base contract in annuitized status (e.g., taxed based on exclusion ratio).

According to an embodiment of the invention, a PAR may be applied to many deferral/annuitization features, such as to a retirement annuity ("RA"). An RA PAR may guarantee a minimum monthly income out from the PAR for life if all scheduled monthly transfers from the base contract into the PAR total return fund are made according to plan. If the PAR total return fund performs, then monthly income has upside immediate variable annuity (IVA). Monthly transfers into the PAR from the base contract may be scheduled, such as by a standing systematic order, for example.

The PAR IVA floor may guarantee minimum monthly income out from the PAR. The income may be earned (e.g., vested) proportionally to the total transfers committed, such as by making scheduled transfers into PAR from the base contract. It may be necessary to ensure that transfers are made promptly according to the terms and condition of the PAR rider. Vesting growth may cease when a scheduled transfer is not made. Vesting may be reduced and growth may cease when a transfer of funds out of the PAR is made. According to an embodiment of the invention, a start date of the PAR monthly income is declared at the issue of the policy and might, for example, be ten years from the purchase date. During the income phase, the PAR may have a minimum period certain of ten years, with an adjustment account and a return on investment (e.g., 3½% AIR). The PAR may carry a separate daily charge (e.g., 40 basis points on the contract) to pay for any guarantees, a trail compensation during the income phase, and current commission options. Additional RA riders may also be added after issue.

According to another exemplary embodiment of the invention, a rider on lifetime payout variable annuities may include a portional annuity rider ("PAR"). Again, the rider can have different features from the base contract and can be annuitized, such as partial annuitization, separately from the base contract. The PAR acts like a separate variable annuity inside another variable annuity, while the base contract status controls the tax status of distributions to the owner/annuitant. Annuitized income from the PAR may be withdrawn from the contract in deferred status (e.g., taxed gain first), transferred to the base contract in deferred status (e.g., tax free transfer), and/or paid-out from base contract in annuitized status (e.g., taxed based on exclusion ratio). The PAR may be applied to many deferral/annuitization features, such as a lifetime payout ("LPO"). An LPO is a life contingent payout annuity. An LPO may have a period certain component and may be either fixed or variable. The LPO PAR may carry a separate daily charge and additional LPO riders may be added after issuance.

Figure 3:
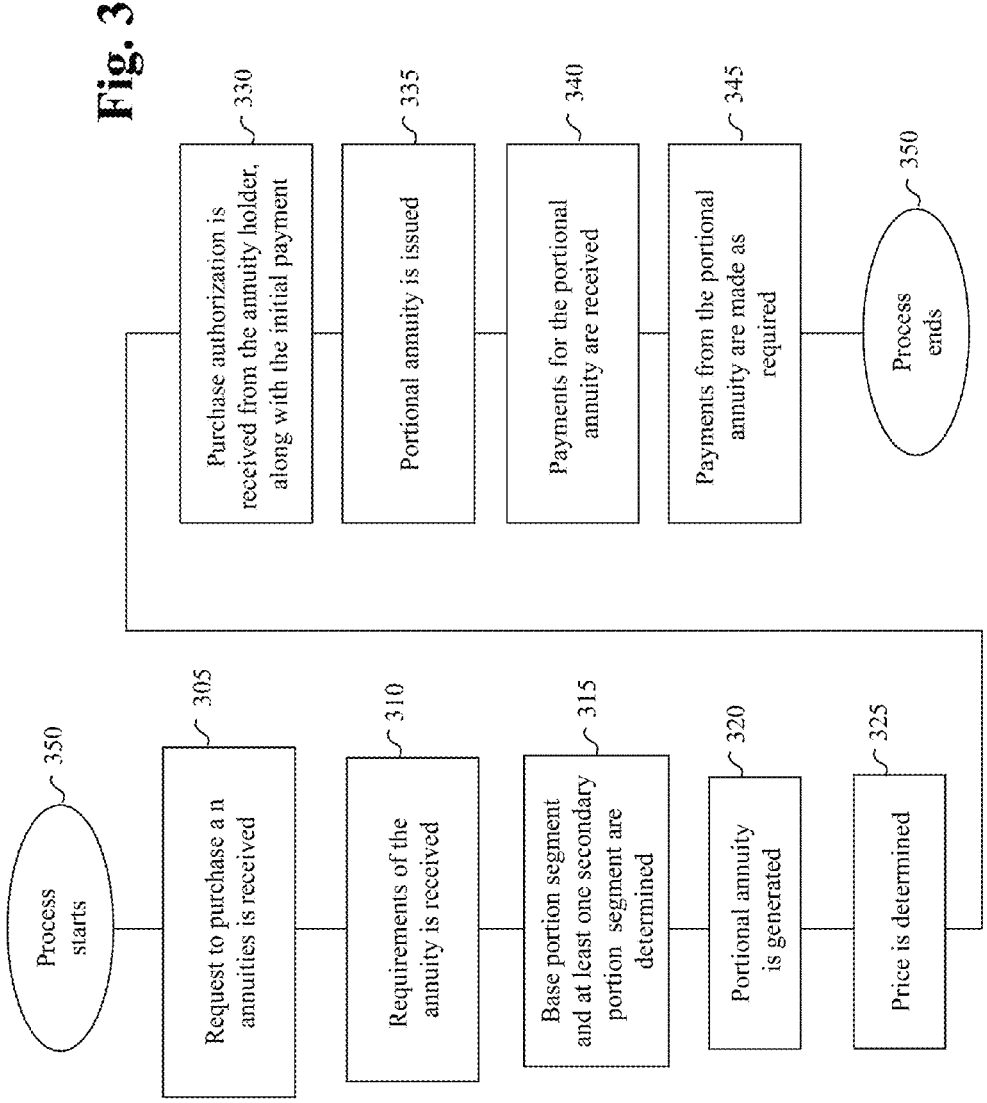
FIG. 3 is a flowchart illustrating a process for purchasing and creating a portional annuity according to an embodiment of the invention.

FIG. 3 is a flowchart illustrating a process for purchasing and creating a portional annuity according to an embodiment of the invention. At step 305, a request to purchase an annuities is received. The requirements of the annuity is received at step 310. At step 315, the base portion segment and at least one secondary portion segment are determined. The portional annuity is generated at step 320, and the price is determined at step 325. A purchase authorization is received from the annuity holder, along with the initial payment, at step 330. The portional annuity is issued at step 335. Payments for the portional annuity are received as required at step 340, while payments from the portional annuity are made as required at step 345. The process ends at step 350. Although the process illustrated in FIG. 3 has been described in one particular combination of steps, it is understood that other steps may be included within the process, steps may be omitted from the process, steps may be performed in a different order, or some combination thereof. The process illustrated in FIG. 3 will now be described in greater detail.

At step 305, a request to purchase a portional annuities is received. According to an embodiment of the invention, a request may be transmitted by a potential purchaser and received by a company that issues annuities, such as an insurance company. It is understood that a request may be received through an intermediary (e.g., an independent insurance agent) and does not have to be received directly from a potential purchaser.

The requirements of the portional annuity is received at step 310. According to an embodiment of the invention, a potential purchase may inform an annuity issuer about the various requirements for the portional annuity, including, but not limited to, the purchase amount of the portional annuity, the payer of the purchases to the portional annuity, the timing of events associated with the portional annuity, the payment amounts from the portional annuity, the recipient of the payments of the portional annuity, and the identity of the portional annuity holder. Further, the financial goals and position of the potential purchaser may be received. According to an embodiment of the invention, a portional annuity may be used in connection with other financial instruments for assisting a purchaser in overall financial planning, including tax, retirement, and estate planning, for example. In requesting and determining the requirements for one or more portional annuities, a potential purchaser may disclose various financial information to the issuer of the portional annuity, (e.g., an agent, representative or employee of the issuer). The issuer may then assist the potential customer in determining the requirements for a portional annuity to help meet the needs and goals of the potential customer.

At step 315, the requirements of the base portion segment and at least one secondary portion segment are determined. According to an embodiment of the invention, the base portion segment and the at least one secondary portion segment are determined based on the requirements determined for the overall portional annuity. The base portion segment and the at least one secondary portion segment are each an annuity, which are then bundled up into on overall annuity. Requirements for the base portion segment and at least one secondary portion segment may include, but are not limited to, the purchase date, the annuity commencement date, the date of the last benefit payment, and the portional income exercise date.

The portional annuity is then created at step 320. The price is determined at step 325. According to an embodiment of the invention, the portional annuity may be created based on the determined requirements for the base portion segment and the at least one secondary portion segment. Creating a portional annuity may include, but is not limited to, creating an account number, storing information about the portional annuity (e.g., storing portional annuity information in a computer data storage device), and associating the name of the portional annuity holder with the stored information.

The price of the portional annuity is determined at step 325. According to an embodiment of the invention, the price of the portional annuity may include all payments to be made to the portional annuity issuer. For example, purchaser of a portional annuity may be required to make an initial payment when purchasing the portional annuity. Further, the purchaser may be required to make subsequent payments, such as at periodic intervals (e.g., annually, quarterly, monthly, etc.). The purchase price determined for the portional annuity may include a total of the initial payment as well as any subsequent payments.

A purchase authorization is received from the portional annuity purchaser, along with the initial payment, at step 330. According to an embodiment of the invention, the portional annuity purchaser may transmit an authorization for the purchase, such as via an in person visit, a facsimile, letter, email, or other manners of transmitting an authorization. In some cases, such as where different types of portional annuities have been considered by a customer, the authorization may include information to identify the portional annuity or annuities the customer desires to purchase. In addition to the authorization, the customer also provides the initial payment.

Payment may be made in any manner, such as, but not limited to, by cash, check, wire-transfer, and electronic funds transfer.

The portional annuity is issued at step 335. According to an embodiment of the invention, issuing the portional annuity may include associating information with the portional annuity (e.g., an account number, the annuity holder's name, the terms of the portional annuity, etc.), generating a hard copy (e.g., a document printed on paper), and storing the portional annuity information. Information about the portional annuity may be stored in a computer storage device which may have a database or other data retrieval system for accessing the information.

Payments for the portional annuity, in accordance with one embodiment of the invention, are received as required at step 340. According to an embodiment of the invention, a portional annuity may require one or more additional payments to be made after the initial purchase payment. By way of example, the payments may include periodic payments (e.g., annually, semi-annually, quarterly, monthly, etc.) by the portional annuity holder during a portion of the life of the portional annuity. Alternatively, another party may make the payments, such as a company that purchases a portional annuity for an employee.

Payments from the portional annuity are made as required at step 345. According to an embodiment of the invention, a portional annuity may make one or more payments over the life time of the portional annuity. By way of example, the payments may include periodic payments (e.g., annually, semi-annually, quarterly, monthly, etc.) to the portional annuity holder during a portion of the life of the portional annuity. Payments may be made by the issuer of the portional annuity, or by a party (e.g., a company, a person, etc.) that agrees to assume from the issuer the obligations of the portional annuity. The process ends at step 350.

Figure 4:
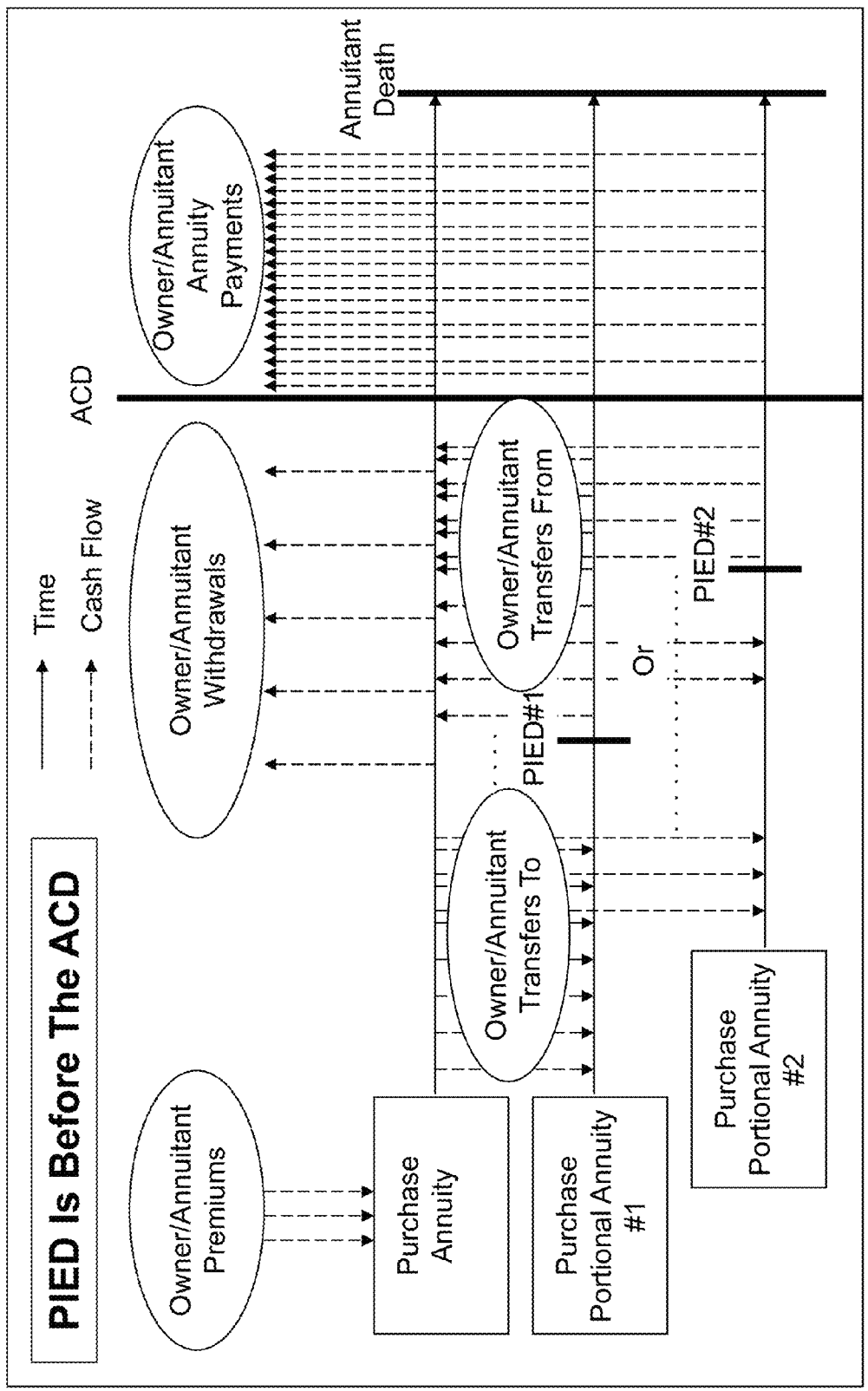
FIG. 4 is a diagram showing a portional annuity wherein the portional income exercise date (PEID) is before the annuity commencement date (ACD) in accordance with one embodiment of the invention.

In further explanation of the invention, FIG. 4 is a diagram showing a portional annuity wherein the portional income exercise date (PEID) is before or after the annuity commencement date (ACD) in accordance with one embodiment of the invention. Further, in contrast, FIG. 5 is a diagram showing a portional annuity wherein the portional income exercise date (PEID) is before or after the annuity commencement date (ACD) in accordance with one embodiment of the invention.

Figure 5:
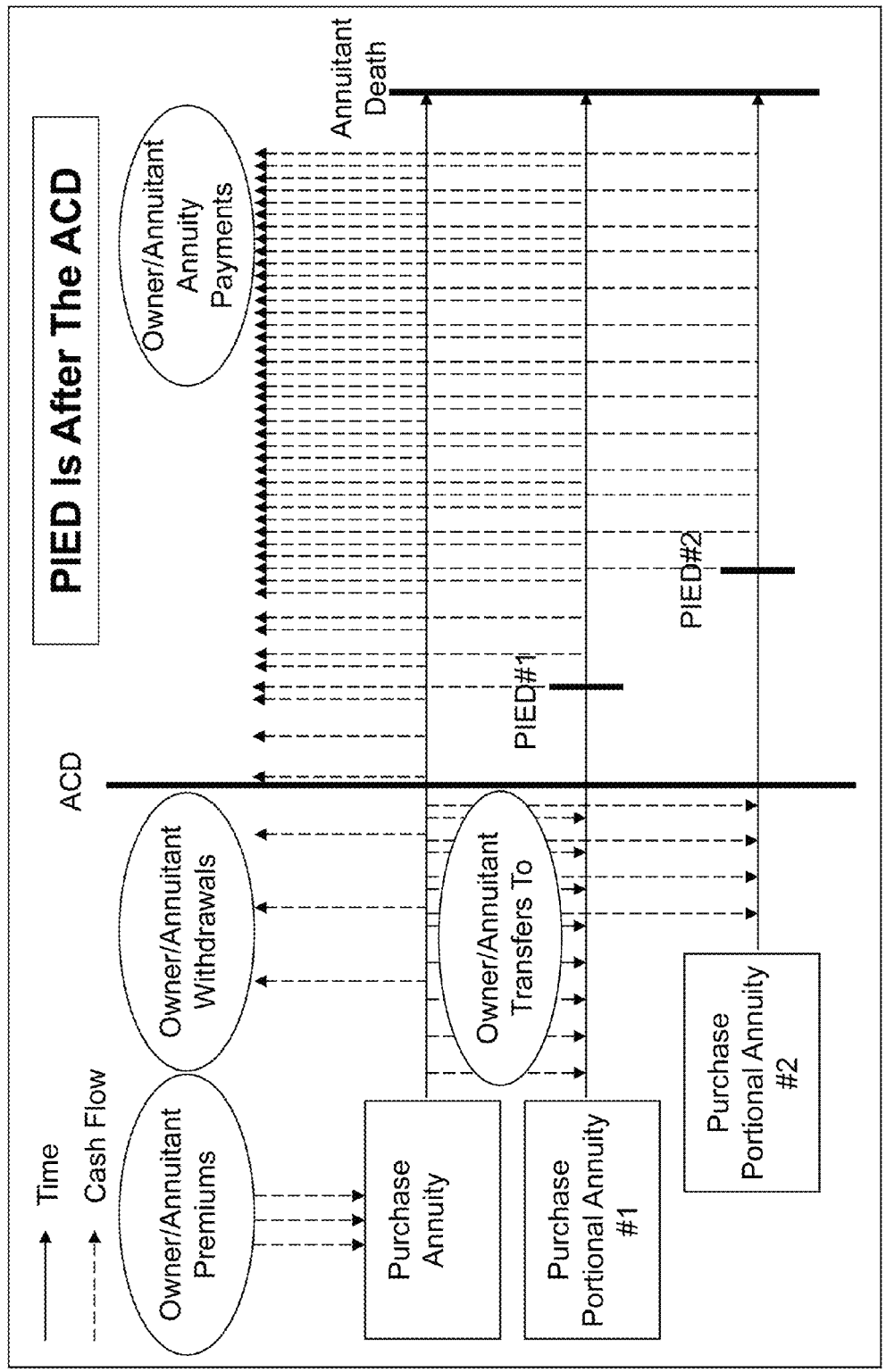
FIG. 5 is a diagram showing a portional annuity wherein the portional income exercise date (PEID) is after the annuity commencement date (ACD) in accordance with one embodiment of the invention.

FIGS. 4 and 5 show various aspects of operation of the novel annuity structure as described herein. In particular, FIGS. 4 and 5 illustrate aspects of the progression of time as the annuity progresses, as well as the associated cash flow.

Figure 6:
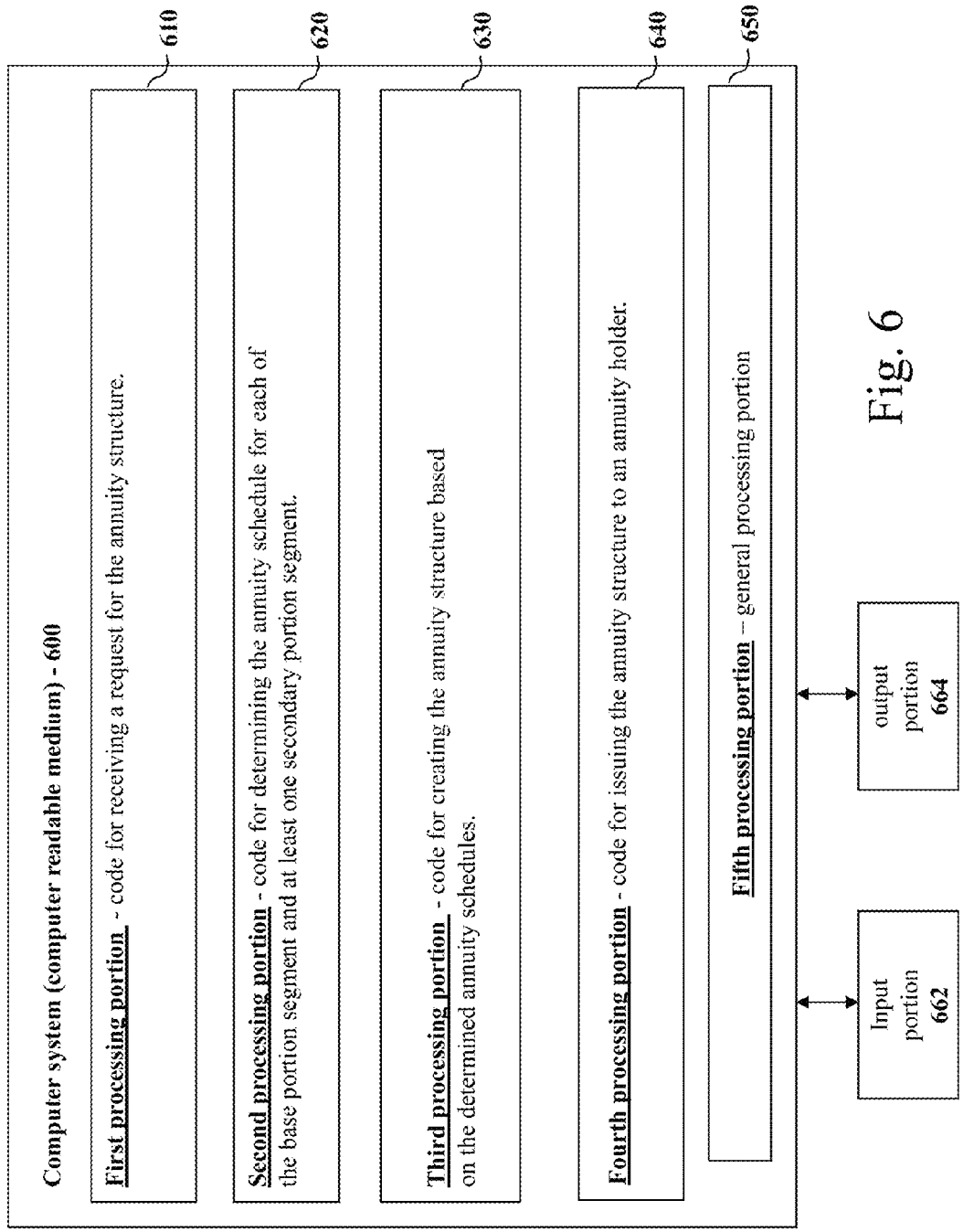
FIG. 6 is schematic diagram of a system for initiating and maintaining a portional annuity according to an embodiment of the invention.

FIG. 6 is diagram of a computer system 600 for initiating and maintaining a portional annuity according to an embodiment of the invention. The computer system 600 may be in the form of particular computer components, i.e., hardware components. Alternatively, the computer system 600 may take the form of a computer readable medium. In accordance with one embodiment of the invention, the computer system 600 is under the control of an insurance company or other annuity issuing entity, for issuing annuities.

To explain further, in accordance with one embodiment of the invention, the computer system 600 may include computer readable medium having code for causing or effecting a process to issue an annuity structure having a base portion segment and at least one secondary portion segment.

In accordance with one embodiment of the invention, the computer readable medium 600 may include a first portion 610 having code for receiving a request for the annuity structure. The request may include financial requirements for the annuity structure.

The computer readable medium 600 may further include a second portion 620 having code for determining the annuity schedule for each of the base portion segment and at least one secondary portion segment. Further, the computer readable medium may include a third portion 630 having code for creating the annuity structure based on the determined annuity schedules.

Further, the computer readable medium 600, as shown in FIG. 6, may include a fourth portion 640 having code for issuing the annuity structure to an annuity holder. As described herein, the base portion segment and at least one secondary portion segment of the annuity are all included in a single contract having one commencement date.

Further, the computer readable medium 600, as shown in FIG. 6, includes a fifth portion 650. The fifth portion 650 is a general processing portion. That is, the fifth portion 650 as described herein is contemplated to effect the various processing as described herein, which is not effected by the portions (610, 620, 630, 640).

Thus, in accordance with one embodiment of the invention, the computer system 600 may be used to perform the process of FIGS. 1-5, as well as the other processing as described herein. As shown in FIG. 6, the computer system 600 includes an input portion 662 and an output portion 664. The input portion 662 may be used to input a wide variety of information into the computer system 600, so as to practice the invention, as shown in FIGS. 1-5, for example. Such information might include the parameters of an annuity, particulars regarding the person holding the annuity, particulars regarding the transfer of monies, as well as any other information needed to practice the invention as discussed herein. Similarly, the output portion 664 may be used to output a wide variety of information from the computer system 600, so as to practice the invention, as shown in FIGS. 1-5, for example.

According to an embodiment of the invention, the present invention may be used as a guaranteed income rider, i.e., an investment rider that, in return for systematic required contributions, allows purchasers to contract with an annuity provider to provide them with a guaranteed predictable, secure retirement income for life. Such a rider would be available for an additional asset based charge on all core variable annuity chassis and as an adjunct option within a fund family of the annuity provider. By way of example, a plan may allow the purchaser to choose their retirement age (e.g., date) and a systematic transfer amount (e.g., $100 per month) from any of the core variable annuity sub-accounts. Each systematic transfer may result in a guaranteed minimum lifetime income payment beginning on the desired income start date, for example.

Systematic rider contributions may be directed into a sub-account that is managed by an asset management entity. According to an embodiment of the invention, the asset management manages this sub-account in a manner consistent with that of a pension fund. The shareholder/policy owner would have the ability to stop contributions at anytime. If they stop contributions, they will receive their accumulated minimum guaranteed income benefit at the pre-selected income start date and no further systematic investments will be accepted. Other features may include the ability to telephone exchange out and drop the rider if circumstances change, the ability to start a second rider if the customer wants to increase the transfer amount, and the ability to receive the rider income in cash or re-invest the income on a non-taxable basis back into the core variable annuity.

According to an embodiment of the invention, a death benefit on the core variable annuity may be reduced on a pro-rata basis when the rider converts to income. If the customer wishes to maintain the death benefit, they may then forego the income payment on the income start date. If the calculated current income benefit, which may be based on actual performance from the fund, now and for the remainder of the customer's lifetime, exceeds the guaranteed amount, the customer may receive the greater amount. If less, the annuity provider may make up the difference and the customer will receive no less than their accumulated guaranteed income benefit for life. Surrender charges, if any, may be governed by the base variable annuity contract or mutual fund share class. A number of life and certain period options may be available. Accounts of both non-qualified and qualified status may be accepted, including IRA's (traditional and Roth), 403(b), Pension/Profit Sharing & 401(k) (self directed).

In explanation of implementation of the systems and methods of the invention, according to an embodiment of the invention, the systems and processes described in this invention may be implemented on any general or special purpose computational device, either as a standalone application or applications, or even across several general or special purpose computational devices connected over a network and as a group operating in a client-server mode. According to another embodiment of the invention, a computer-usable and writeable medium having a plurality of computer readable program code stored therein may be provided for practicing the process of the present invention. The process and system of the present invention may be implemented within a variety of operating systems, such as a Windows® operating system, various versions of a Unix-based operating system (e.g., a Hewlett Packard, a Red Hat, or a Linux version of a Unix-based operating system), or various versions of an AS/400-based operating system. For example, the computer-usable and writeable medium may be comprised of a CD ROM, a floppy disk, a hard disk, or any other computer-usable medium.

One or more of the components of the system or systems embodying the present invention may comprise computer readable program code in the form of functional instructions stored in the computer-usable medium such that when the computer-usable medium is installed on the system or systems, those components cause the system to perform the functions described. The computer readable program code for the present invention may also be bundled with other computer readable program software. Also, only some of the components may be provided in computer-readable code.

Additionally, various entities and combinations of entities may employ a computer to implement the components performing the above-described functions. According to an embodiment of the invention, the computer may be a standard computer comprising an input device, an output device, a processor-device, and a data storage device. According to other embodiments of the invention, various components may be computers in different departments within the same corporation or entity. Other computer configurations may also be used. According to another embodiment of the invention, various components may be separate entities such as corporations or limited liability companies. Other embodiments, in compliance with applicable laws and regulations, may also be used.

According to one specific embodiment of the present invention, the system may comprise components of a software system. The system may operate on a network and may be connected to other systems sharing a common database. Other hardware arrangements may also be provided.

It will be readily understood by those persons skilled in the art that the present invention is susceptible to broad utility and application. Many embodiments and adaptations of the present invention other than those described herein, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

The invention claimed is:

1. A method, implemented on a computational device, for issuing an annuity structure having a base portion segment and at least one secondary portion segment, the method comprising:

generating, by the computational device, an annuity structure comprising:
   a base portion segment, where the base portion segment is a functional annuity having a first annuity schedule; and
   a secondary portion segment, where the secondary portion segment is a functional annuity having a second annuity schedule;
   where the base portion segment and the secondary portion segment each operate as its own annuity;
   the base portion segment and the secondary portion segment being each included in a single contract; and
issuing, by the computational device, the annuity structure to an annuity holder; and
the annuity structure has an annuity commencement date of the base portion segment under the contract, the annuity commencement date of the base portion segment effecting cash flow of both the base portion segment and the secondary portion segment, and
the annuity structure having an annuity commencement date of the secondary portion segment under the contract, the annuity commencement date of the secondary portion segment being different than the annuity commencement date of the base portion segment; and
the base portion segment constituted by an accumulation period followed by a payout period, and
the secondary portion segment constituted by and accumulation period followed by a payout period.

2. The annuity structure of claim 1, where the annuity structure comprises a plurality of secondary portion segments, where:
   each of the plurality of secondary portion segment is a functional annuity having a separate annuity schedule; and
   each of the plurality of secondary portion segments operates as its own annuity, each of the plurality of secondary portion segments being included in the contract.

3. The annuity structure of claim 1, wherein the secondary portion segment has a portion exercise income date that is independent of the annuity commencement date for the annuity structure.

4. The annuity structure of claim 1, where funds are transferred between the base portion segment and the secondary portion segment.

5. The annuity structure of claim 2, further including a plurality of base portion segments, and where funds are transferred between a first one of the plurality of base portion segments and a second one of the plurality of base portion segments.

6. A method, implemented on a computational device, for issuing an annuity structure having a base portion segment and at least one secondary portion segment the method comprising:
generating, by the computational device, an annuity structure comprising:
a base portion segment, where the base portion segment is a functional annuity having a rust annuity schedule; and
a plurality of secondary portion segments, where each of the plurality of secondary portion segments is a functional annuity having a separate annuity schedule; and
where the base portion segment and each of the plurality of secondary portion segments operates as its own annuity;
the base portion segment and each of the plurality of secondary portion segments is included under a single contract;
the annuity structure has an annuity commencement date of the base portion segment under the contract, the annuity commencement date of the base portion segment effecting cash flow of both the base portion segment and the secondary portion segments, and
the annuity structure having a respective annuity commencement date for each of the secondary portion segments under the contract, the annuity commencement dales for each of the secondary portion segments being different than the annuity commencement date of the base portion segment;
each of the plurality of secondary portion segments have a portion exercise income date that is independent of the annuity commencement dates for the annuity structure; and issuing, by the computational device, the annuity structure to an annuity holder; and the base portion segment constituted by an accumulation period followed by a payout period, and
the secondary portions segment constituted by an accumulation period followed by a payout period.

7. The method of claim 1, further including implementing the annuity structure as a guaranteed income rider.

8. A process, implemented on a computational device, for issuing an annuity structure having a base portion segment and at least one secondary portion segment, the process comprising the steps of:
receiving, by the computational device, a request for the annuity structure, where the request includes financial requirements for the annuity structure;
determining, by the computational device, an annuity schedule for each of the base portion segment and at least one secondary portion segment;
creating, by the computational device, the annuity structure based on the determined annuity schedules; and
issuing, by the computational device, the annuity structure to an annuity holder; and
wherein the base portion segment and at least one secondary portion segment are all included under a single contract; and
the annuity structure has an annuity commencement date of the base portion segment under the contract, the annuity commencement date of the base portion segment effecting cash flow of both the base portion segment and the secondary portion segment, and
the annuity structure having an annuity commencement date of the secondary portion segment under the contract, the annuity commencement date of the secondary portion segment being different than the annuity commencement date of the base portion segment; and
the base portion segment constituted by and accumulation period followed by a payout period, and
the secondary portion segment constituted by and accumulation period followed by a payout period.

9. The process according to claim 8, further comprising the step of receiving an initial payment prior to the issuance of the annuity.

10. The process according to claim 8, further comprising the step of receiving a plurality of payments subsequent to the issuance of the annuity, where the payments are received based on the determined annuity schedules.

11. The process according to claim 8, further comprising the step of making a plurality of payments to the annuity bolder subsequent to the issuance of the annuity, where the payments are made based on the determined annuity schedules.

12. The process according to claim 8, where the annuity structure has an annuity commencement date based on the annuity schedule for the base portion segment.

13. The process according to claim 12, where the secondary portion segment has a portion exercise income date that is independent of the annuity commencement date for the annuity structure.

14. The process for issuing an annuity of claim 8, wherein: the base portion segment has a first income start date; and the secondary portion segment has a second income start date, the first income start date being different than the second income start date.

15. A computer readable medium, implemented on a computational device, having code for causing a process, performed by the computational device, to issue an annuity structure having a base portion segment and at least one secondary portion segment, the computer readable medium comprising:
code, implemented by the computational device, that receives a request for the annuity structure, where the request includes financial requirements for the annuity structure;
code, implemented by the computational device, that determines the annuity schedule for each of the base portion segment and at least one secondary portion segment;
code, implemented by the computational device, that creates the annuity structure based on the determined annuity schedules; and
code, implemented by the computational device, that issues the annuity structure to an annuity holder, and
wherein the base portion segment and at least one secondary portion segment are all included in a single contract; and
the annuity structure has an annuity commencement date of the base portion segment under the contract, the annuity commencement date of the base portion segment effecting cash flow of both the base portion segment and the secondary portion segment, and
the annuity structure having an annuity commencement date of the secondary portion segment under the contract, the annuity commencement date of the secondary portion segment being different than the annuity commencement date of the base portion segment; and
the base portion segment constituted by and accumulation period followed by a payout period, and
the secondary portion segment constituted by an accumulation period followed by a payout period.

16. The computer readable medium according to claim 15, further comprising code, implemented by the computational device, that receives an initial payment prior to the issuance of the annuity.

17. The computer readable medium according to claim 15, further comprising code, implemented by the computational device, that receives a plurality of payments subsequent to the issuance of the annuity, where the payments are received based on the determined annuity schedules.

18. The computer readable medium according to claim 15, further comprising code, implemented by the computational device, that makes a plurality of payments to the annuity holder subsequent to the issuance of the annuity, where the payments are made based on the determined annuity schedules.

19. The computer readable medium according to claim 15, where the annuity structure has an annuity commencement date based on the annuity schedule for the base portion segment.

20. The computer readable medium according to claim 19, where the secondary portion segment has a portion exercise income date that is independent of the annuity commencement dates for the annuity structure.

* * * * *